(12) United States Patent
Harada et al.

(10) Patent No.: US 10,060,338 B2
(45) Date of Patent: Aug. 28, 2018

(54) INTERCOOLER

(71) Applicant: DENSO CORPORATION, Kariya, Aichi-pref. (JP)

(72) Inventors: Masaki Harada, Kariya (JP); Akira Yamanaka, Kariya (JP); Masafumi Saitou, Kariya (JP); Takashi Yasuda, Kariya (JP); Taichi Asano, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 94 days.

(21) Appl. No.: 15/109,742

(22) PCT Filed: Jan. 12, 2015

(86) PCT No.: PCT/JP2015/000092
§ 371 (c)(1),
(2) Date: Jul. 5, 2016

(87) PCT Pub. No.: WO2015/107882
PCT Pub. Date: Jul. 23, 2015

(65) Prior Publication Data
US 2016/0326949 A1    Nov. 10, 2016

(30) Foreign Application Priority Data

Jan. 14, 2014   (JP) ................................ 2014-004413
Oct. 28, 2014   (JP) ................................ 2014-219329

(51) Int. Cl.
*B60H 1/00*       (2006.01)
*F02B 29/04*      (2006.01)
(Continued)

(52) U.S. Cl.
CPC ...... *F02B 29/0443* (2013.01); *F02B 29/0462* (2013.01); *F28D 9/0043* (2013.01);
(Continued)

(58) Field of Classification Search
CPC ...... F28D 9/0043; F28D 9/005; F28D 9/0093; F28D 1/0341; F28D 1/0375; F02B 29/0443

See application file for complete search history.

(56) References Cited

U.S. PATENT DOCUMENTS 6,318,455 B1 *  11/2001   Nakado ................. F28D 1/0341
                                                165/153
2002/0011242 A1   1/2002   Ruppel et al.
(Continued)

FOREIGN PATENT DOCUMENTS

JP     2003097277 A    4/2003
JP     2013145097 A    7/2013
WO     WO-2012080508 A1   6/2012

*Primary Examiner* — Len Tran
*Assistant Examiner* — Jon T Schermerhorn
(74) *Attorney, Agent, or Firm* — Harness, Dickey & Pierce, P.L.C.

(57) ABSTRACT

An intercooler that cools intake air supercharged into an engine by a supercharger by exchanging heat with a cooling medium includes a heat exchange portion in which heat is exchanged between the cooling medium flowing inside a channel tube and the supercharged intake air flowing outside the channel tube. The cooling medium includes a first cooling medium and a second cooling medium hotter than the first cooling medium. The channel tube includes a first cooling medium channel where the first cooling medium flows and a second cooling medium channel where the second cooling medium flows. The channel tube includes a first U-turn portion forcing a flow of the first cooling medium flowing the first cooling medium channel to make a U-turn, and a second U-turn portion forcing a flow of the second cooling medium flowing the second cooling medium channel to make a U-turn.

7 Claims, 6 Drawing Sheets

(51) Int. Cl.
*F28D 9/00* (2006.01)
*F28F 13/06* (2006.01)
*F28D 21/00* (2006.01)

(52) U.S. Cl.
CPC ......... *F28D 9/0056* (2013.01); *F28D 9/0093* (2013.01); *F28F 13/06* (2013.01); *F28D 2021/0082* (2013.01); *F28F 2210/10* (2013.01); *Y02T 10/146* (2013.01)

(56) References Cited

U.S. PATENT DOCUMENTS

| | | | |
|---|---|---|---|
| 2013/0276763 A1 | 10/2013 | Eilemann et al. | |
| 2014/0246179 A1* | 9/2014 | Vallee | F28F 13/08 165/109.1 |
| 2016/0003128 A1* | 1/2016 | Berger | F02B 29/0443 165/145 |

* cited by examiner

INTERCOOLER

CROSS REFERENCE TO RELATED APPLICATIONS

This application is a U.S. National Phase Application under 35 U.S.C. 371 of International Application No. PCT/JP2015/000092 filed on Jan. 12, 2015 and published in Japanese as WO 2015/107882 A1 on Jul. 23, 2015. This application is based on and claims the benefit from Japanese Patent Application No. 2014-004413 filed on Jan. 14, 2014 and Japanese Patent Application No. 2014-219329 filed on Oct. 28, 2014. The entire disclosures of all the above applications are incorporated herein by reference.

TECHNICAL FIELD

The present disclosure relates to an intercooler cooling intake air supercharged by a supercharger.

BACKGROUND ART

An intercooler that cools supercharged intake air is disclosed, which performs heat exchange between the supercharged air supplied to an engine (internal combustion engine) by a supercharger and two types of cooling waters having temperatures different from each other (see, for example, Patent Literature 1). The intercooler described in Patent Literature 1 is configured in such a manner that a hot cooling water flows in an upstream part of a supercharged intake air passage where the supercharged intake air passes through while a cold cooling water flows in a downstream part of the supercharged intake air passage.

According to the configuration as above, the cold cooling water can be warmed quickly with heat of the hot cooling water at engine start-up. Further, because the supercharged intake air can be pre-cooled with the hot cooling water before the supercharged intake air is cooled with the cold cooling water, cooling performance of a supercharged intake air cooling system can be enhanced.

PRIOR ART LITERATURES

Patent Literature

Patent Literature 1 : WO 2012/080508A

SUMMARY OF INVENTION

The intercooler described in Patent Literature 1 adopts a double-path channel configuration as a channel configuration of a cold cooling water passage where the cold cooling water flows, thereby forcing a flow of the cold cooling water to make a U-turn. On the other hand, the intercooler adopts a full-path (single-path) channel configuration as a channel configuration of a hot cooling water passage where the hot cooling water flows, thereby allowing the hot cooling water to flow without making a U-turn.

Accordingly, a temperature difference between at an inlet and at an outlet of the hot cooling water channel is increased, that is, a temperature difference between at one end and the other end in a flow direction of the hot cooling water is increased. Thermal uniformity becomes poor due to such a large temperature difference in a warming at engine start-up. Also, because pre-cooling of the supercharged intake air fails to provide a sufficient effect enhancing the cooling performance, the cooling performance is deteriorated.

In view of the points discussed above, the present disclosure has an object to provide an intercooler capable of improving thermal uniformity in warming an engine at a start-up time and enhancing cooling performance.

According to an aspect of the present disclosure, an intercooler that cools intake air supercharged into an engine by a supercharger by exchanging heat with a cooling medium includes a heat exchange portion in which heat is exchanged between the cooling medium flowing inside a channel tube and the supercharged intake air flowing outside the channel tube. The cooling medium includes a first cooling medium and a second cooling medium hotter than the first cooling medium. The channel tube includes a first cooling medium channel where the first cooling medium flows and a second cooling medium channel where the second cooling medium flows. The channel tube includes a first U-turn portion forcing a flow of the first cooling medium flowing the first cooling medium channel to make a U-turn, and a second U-turn portion forcing a flow of the second cooling medium flowing the second cooling medium channel to make a U-turn.

By providing the channel tube with the second U-turn portion forcing a flow of the second cooling medium hotter than the first cooling medium to make a U-turn, a temperature difference between one end and the other end in a flow direction of the second cooling medium can be reduced when viewed from a flow direction of the supercharged intake air. Hence, thermal uniformity can be improved in warming an engine at a start-up time. Also, because pre-cooling of the supercharged intake air can provide a sufficient effect enhancing the cooling performance, the cooling performance can be enhanced.

DESCRIPTION OF EMBODIMENTS

Hereinafter, embodiments will be described according to the drawings. Portions same as or equivalent to each other in respective embodiments below are labeled with same reference numerals in the drawings.

First Embodiment

A first embodiment will be described according to the drawings. The first embodiment will describe a case where an intercooler is applied to a supercharged intake air cooling system in a vehicle.

Figure 1:
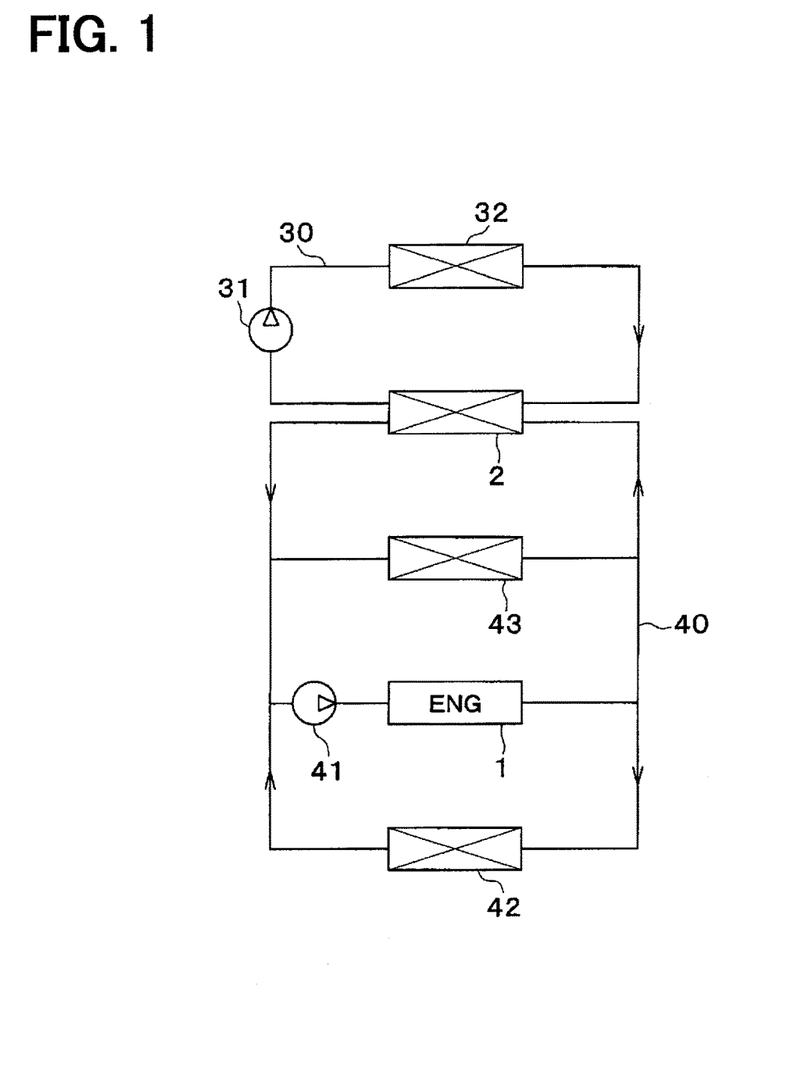
FIG. 1 is a configuration view schematically showing a supercharged intake air cooling system, for a vehicle, according to a first embodiment.

As is shown in FIG. 1, an inlet system of an engine (internal combustion engine) 1 in a vehicle is provided with a supercharger (not shown) that forces supercharged intake air into the engine 1. The supercharger is provided to complement to a maximum output of the engine 1. That is to say, the vehicle of the present embodiment has the engine 1 made smaller for higher fuel efficiency and the supercharger is used to compensate for the maximum output reduced in exchange for making the engine 1 smaller.

An intercooler 2 to cool engine intake air is provided downstream of the supercharger in a flow of intake air in the inlet system. The intercooler 2 plays a role of improving charging efficiency of the engine intake air by cooling supercharged intake air compressed by the supercharger.

The intercooler 2 is provided to a first cooling water circuit 30 in which a first cooling water circulates and the first cooling water flows inside the intercooler 2. A second cooling water that circulates in a second cooling water circuit 40 also flows inside the intercooler 2. The intercooler 2 cools supercharged intake air compressed by the supercharger by heat exchange between the supercharged intake air and the first and second cooling waters.

The first cooling water circuit 30 is provided with a water pump 31 that pumps out the first cooling water to circulate in the first cooling water circuit 30. A first radiator (first heat sink) 32, which cools the first cooling water by letting the first cooling water give off heat to atmosphere, is provided between the water pump 31 and the intercooler 2 in the first cooling water circuit 30.

The second cooling water circuit 40 is provided with a water pump 41, a second radiator (second heat sink) 42, and a heater core (heating heat exchanger) 43. The water pump 41 pumps out the second cooling water to circulate in the second cooling water circuit 40. The second radiator dissipates heat of the second cooling water absorbed from the engine 1 to atmosphere. The heater core 43 heats blown air to be blown into a vehicle interior by heat exchange between the blown air and the second cooling water. The intercooler 2, the second radiator 42, and the heater core 43 are disposed in parallel in the second cooling water circuit 40.

Because the second cooling water absorbs heat from the engine 1, the temperature of the second cooling water becomes higher than that of the first cooling water when the second cooling water flows inside the intercooler 2. Hence, the first cooling water of the present embodiment corresponds to a first cooling medium of the present disclosure and the second cooling water of the present embodiment corresponds to a second cooling medium of the present disclosure. The first and second cooling waters can be an anti-freeze liquid known as an LLC (Long Life Cooling water), water, or the like.

In the present embodiment, a drive force of the water pumps 31 and 41 is transmitted from the engine 1. It should be appreciated, however, that electric water pumps may be used as the water pumps 31 and 41.

Figure 2:
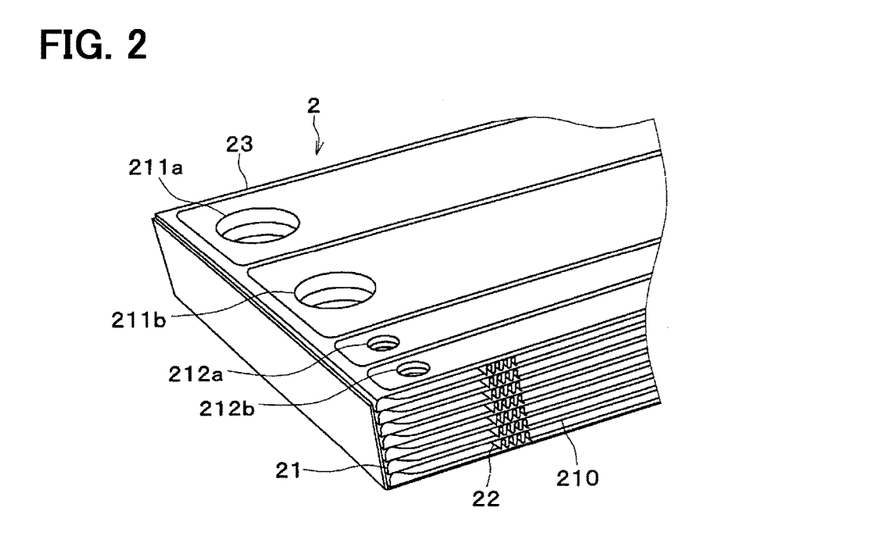
FIG. 2 is a perspective view showing an intercooler of the first embodiment.

The intercooler 2 of the first embodiment will now be described in detail. As is shown in FIG. 2, the intercooler 2 includes a heat exchanging portion 23 in which multiple channel tubes 21 and fins 22 are stacked alternately in such a manner that one fin 22 is bonded between every pair of adjacent channel tubes 21. The heat exchanging portion 23 is configured in such a manner that heat is exchanged between the first and second cooling waters flowing inside the channel tubes 21 and supercharged intake air flowing outside the channel tubes 21.

The fins 22 are corrugate fins formed of a thin plate material folded into alternating ridges and grooves like waves. The fins 22 are bonded to flat outer surfaces of the channel tubes 21 and form a heat-exchange promoting portion to increase a heat-transfer area between the supercharged intake air and the first and second cooling waters.

Figure 3:
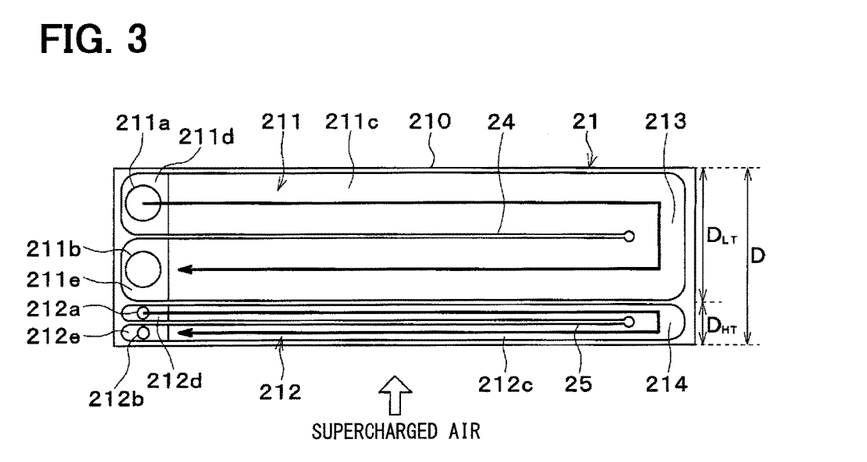
FIG. 3 is a diagram showing an inner portion of a channel tube of the first embodiment.

As is shown in FIG. 3, a first cooling water channel 211 where the first cooling water flows and a second cooling water channel 212 where the second cooling water flows are provided in each channel tube 21. In each channel tube 21, the first cooling water channel 211 and the second cooling water channel 212 are disposed side by side in a flow direction of the supercharged intake air.

In the present embodiment, the first cooling water channel 211 is disposed downstream of the second cooling water channel 212 in the flow of the supercharged intake air. In other words, the intercooler 2 of the present embodiment is configured in such a manner that the second cooling water flows in an upstream part of a supercharged intake air passage where the supercharged intake air passes through while the first cooling water flows in a downstream part of the supercharged intake air passage.

The channel tube 21 has a first U-turn portion 213 forcing a flow of the first cooling water flowing the first cooling water channel 211 to make a U-turn and a second U-turn portion 214 forcing a flow of the second cooling water flowing the second cooling water channel 212 to make a U-turn. In the present embodiment, each channel tube 21 has one first U-turn portion 213 and one second U-turn portion 214. Hence, each of the first cooling water and the second cooling water flows inside the channel tube 21 like substantially a U-flow.

The intercooler 2 includes a first distribution tank portion (not shown) from which the first cooling water is distributed into the first cooling water channels 211 in the multiple channel tubes 21 and a first collection tank portion (not shown) into which the first cooling water is collected from the first cooling water channels 211 in the multiple channel tubes 21. Also, the intercooler 2 includes a second distribution tank portion (not shown) from which the second cooling water is distributed into the second cooling water channels 212 in the multiple channel tubes 21 and a second collection tank portion (not shown) into which the second cooling water is collected from the second cooling water channels 212 in the multiple channel tubes 21.

Each channel tube 21 includes a first inlet 211a through which the first cooling water flows into the first cooling water channel 211 and a first outlet 211b through which the first cooling water flows out from the first cooling water channel 211. Also, each channel tube 21 includes a second inlet 212a through which the second cooling water flows into the second cooling water channel 212 and a second outlet 212b through which the second cooling water flows out from the second cooling water channel 212.

The first inlet 211a, the first outlet 211b, the second inlet 212a, and the second outlet 212b are formed by making through-holes in the channel tube 21. Hence, the second inlet 212a and the second outlet 212b of the present embodiment correspond to a through-hole.

In the present embodiment, the first inlet 211a, the first outlet 211b, the second inlet 212a, and the second outlet 212b are all provided at one end of the channel tube 21 in a longitudinal direction. The first inlet 211a, the first outlet 211b, the second inlet 212a, and the second outlet 212b are provided sequentially from downstream to upstream in the flow of the supercharged intake air with the first inlet 211*a* at the lowermost position.

An internal configuration of the channel tube 21 will now be described more in detail. The first cooling water channel 211 has two first mainstream portions 211*c* extending in the longitudinal direction of the channel tube 21 (right-left direction on the sheet surface), the first U-turn portion 213 connecting the two first mainstream portions 211*c*, a first inlet forming portion 211*d* in which the first inlet 211*a* is formed, and a first outlet forming portion 211*e* in which the first outlet 211*b* is formed. The channel tube 21 is provided with a first partition portion 24 which separates the two first mainstream portions 211*c* from each other and also separates the first inlet forming portion 211*d* from the first outlet forming portion 211*e*.

The second cooling water channel 212 has two second mainstream portions 212*c* extending in the longitudinal direction of the channel tube 21, the second U-turn portion 214 connecting the two second mainstream portions 212*c*, a second inlet forming portion 212*d* in which the second inlet 212*a* is formed, and a second outlet forming portion 212*e* in which the second outlet 212*b* is formed. The channel tube 21 is provided with a second partition portion 25 which separates the two second mainstream portions 212*c* from each other and also separates the second inlet forming portion 212*d* from the second outlet forming portion 212*e*. The second inlet forming portion 212*d* and the second outlet forming portion 212*e* of the present embodiment correspond to a through-hole forming portion.

The intercooler 2 of the present embodiment has so-called a drawn-cup heat exchanger structure in which multiple channel tubes 21 each formed by bonding a pair of plate-like members 210 edge to edge in the form of a hollow tube and multiple plate members provided with four tank portions communicating with the channel tubes 21 are stacked while the fins 22 are interposed between the plate members. In other words, the channel tube 21 is formed by bonding two opposing plate-like members 210. The drawn cup heat exchanger structure as above is adapted to the configuration of the present embodiment having four tank portions by stacking multiple plate members so as to enable communications among the corresponding tank portions provided to the plate members.

The channel tube 21 of the present embodiment may include a first inner fin that divides the first cooling water channel 211 to multiple fine channels and a second inner fin that divides the second cooling water channel 212 to multiple fine channels.

Herein, a length of the channel tube 21 in the flow direction of the supercharged intake air is defined as D. A portion of the channel tube 21 where the first cooling water channel 211 is formed (hereinafter, the portion is referred to as a first cooling water channel forming portion) is defined to have a length of $D_{LT}$ in the flow direction of the supercharged intake air. Another portion of the channel tube 21 where the second cooling water channel 212 is formed (hereinafter, the another portion is referred to as a second cooling water channel forming portion) is defined to have a length of $D_{HT}$ in the flow direction of the supercharged intake air. A ratio of the lengths of the first cooling water channel forming portion and the second cooling water channel forming portion in the flow direction of the supercharged intake air is referred to as a passage ratio ($D_{HT}/D_{LT}$).

In the present embodiment, the length $D_{LT}$ of the first cooling water channel forming portion in the flow direction of the supercharged intake air is substantially equal to twice a length of the first mainstream portion 211*c* in the flow direction of the supercharged intake air plus a length of the first partition portion 24 in the flow direction of the supercharged intake air. Also, the length $D_{HT}$ of the second cooling water channel forming portion in the flow direction of the supercharged intake air is substantially equal to twice a length of the second mainstream portion 212*c* in the flow direction of the supercharged intake air plus a length of the second partition portion 25 in the flow direction of the supercharged intake air.

Figure 4:
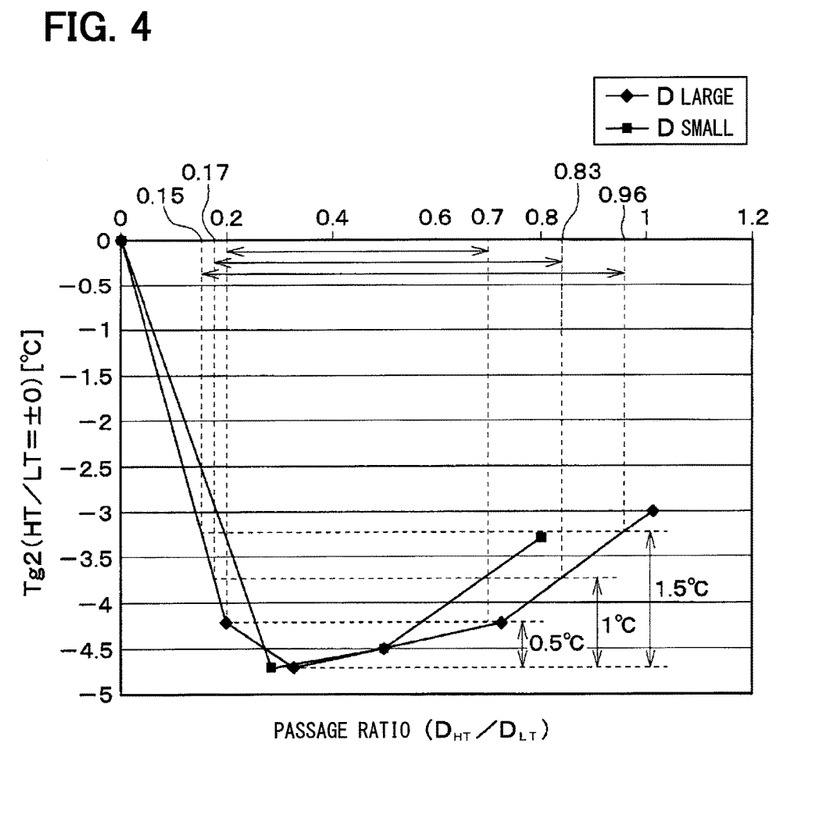
FIG. 4 is a characteristic view showing a relation of a passage ratio and an outlet temperature of supercharged intake air.

FIG. 4 shows an outlet temperature Tg2 of the supercharged intake air in the intercooler 2 when the passage ratio $D_{HT}/D_{LT}$ is varied with the length D of the channel tube 21 in the flow direction of the supercharged intake air held constant. In FIG. 4, an ordinate indicates an outlet temperature Tg2 of the supercharged intake air in the intercooler 2 by using the outlet temperature Tg2 of the supercharged intake air when the passage ratio $D_{HT}/D_{LT}$ is 0, that is, when the second cooling water channel 212 is not provided to the channel tube 21, as a reference temperature (0° C.).

It is understood from a result shown in FIG. 4 that curves each indicating a relation of the passage ratio $D_{HT}/D_{LT}$ and the outlet temperature Tg2 of the supercharged intake air in the intercooler 2 show similar tendencies independently of the length D of the channel tube 21 in the flow direction of the supercharged intake air.

By setting the passage ratio $D_{HT}/D_{LT}$ to a range from 0.15 to 0.96 both inclusive, the outlet temperature Tg2 of the supercharged intake air can be lowered within a range of 1.5° C. from a lowest temperature. By setting the passage ratio $D_{HT}/D_{LT}$ to a range from 0.17 to 0.83 both inclusive, the outlet temperature Tg2 of the supercharged intake air can be lowered within a range of 1° C. from the lowest temperature. Further, by setting the passage ratio $D_{HT}/D_{LT}$ to a range from 0.2 to 0.7 both inclusive, the outlet temperature Tg2 of the supercharged intake air can be lowered within a range of 0.5° C. from the lowest temperature.

Figure 5:
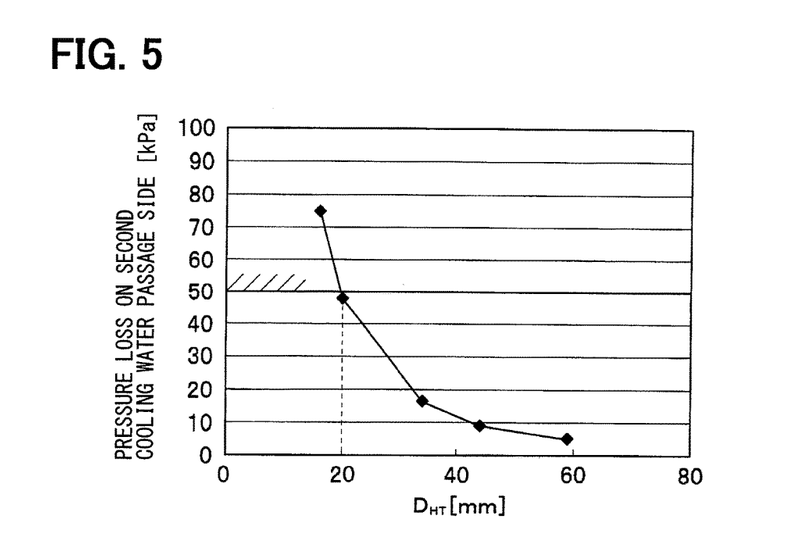
FIG. 5 is a characteristic view showing a relation of a length of a second cooling water channel forming portion in a flow direction of the supercharged intake air and a pressure loss in a second cooling water channel.

FIG. 5 shows a relation of the length $D_{HT}$ of the second cooling water channel forming portion in the flow direction of the supercharged intake air and a pressure loss in the second cooling water channel 212. It is understood from a result shown in FIG. 5 that a pressure loss in the second cooling water channel 212 increases as the length $D_{HT}$ of the second cooling water channel forming portion in the flow direction of the supercharged intake air becomes shorter.

In the supercharged intake air cooling system of the present embodiment, as is shown in FIG. 1, the second cooling water channel 212 of the intercooler 2 and the heater core 43 are disposed in parallel. Hence, when a pressure loss in the second cooling water channel 212 of the intercooler 2 is too large, the cooling water may hardly flow toward the intercooler 2 and cooling performance of the supercharged intake air is possibly deteriorated.

More specifically, it is preferable to set a flow rate Vw of the cooling water in the second cooling water channel 212 to 10 l/min or higher in order to secure a flow of the cooling water in the second cooling water channel 212. In order to set the flow rate Vw of the cooling water in the second cooling water channel 212 to 10 l/min or higher, it is necessary to reduce a pressure loss in the second cooling water channel 212 to 50 kPa or less. Hence, as is shown in FIG. 5, by setting the length $D_{HT}$ of the second cooling water channel forming portion in the flow direction of the supercharged intake air to 20 mm or longer, a pressure loss in the second cooling water channel 212 can be reduced to 50 kPa or less. Consequently, a flow of the cooling water in the second cooling water channel 212 can be secured.

As has been described above, by providing the channel tube 21 with the second U-turn portion 214 forcing a flow of the second cooling water hotter than the first cooling water to make a U-turn, a temperature difference between one end and the other end of the channel tube 21 in a flow direction of the second cooling water (longitudinal direction of the channel tube 21) can be reduced when viewed in the flow direction of the supercharged intake air. Hence, thermal uniformity can be improved in warming-up at the start-up of the engine 1. Further, because pre-cooling of the supercharged intake air with the second cooling water can provide a sufficient effect enhancing the cooling performance, the cooling performance can be enhanced.

More specifically, it is preferable to set the passage ratio $D_{HT}/D_{LT}$ to a range from 0.15 to 0.96 both inclusive because the outlet temperature Tg2 of the supercharged intake air can be lowered. It is more preferable to set the passage ratio $D_{HT}/D_{LT}$ to a range from 0.17 to 0.83 both inclusive because the outlet temperature Tg2 of the supercharged intake air can be lowered further. It is most preferable to set the passage ratio $D_{HT}/D_{LT}$ to a range from 0.2 to 0.7 both inclusive because the outlet temperature Tg2 of the supercharged intake air can be lowered still further.

By setting the length $D_{HT}$ of the second cooling water channel forming portion in the flow direction of the supercharged intake air to 20 mm or longer, an increase in pressure loss in the second cooling water channel 212 can be restricted and a flow of the cooling water in the second cooling water channel 212 can be secured. Hence, the cooling performance can be enhanced in a reliable manner.

When the length D of the channel tube 21 in the flow direction of the supercharged intake air is too long, it becomes difficult to install the intercooler 2 to a vehicle. Hence, from a practical point of view, it is preferable to set the length D of the channel tube 21 in the flow direction of the supercharged intake air to 200 mm or shorter.

Second Embodiment

A second embodiment will be described with reference to FIG. 6 through FIG. 8. The second embodiment is different from the first embodiment above in a configuration of a channel tube 21.

Figure 6:
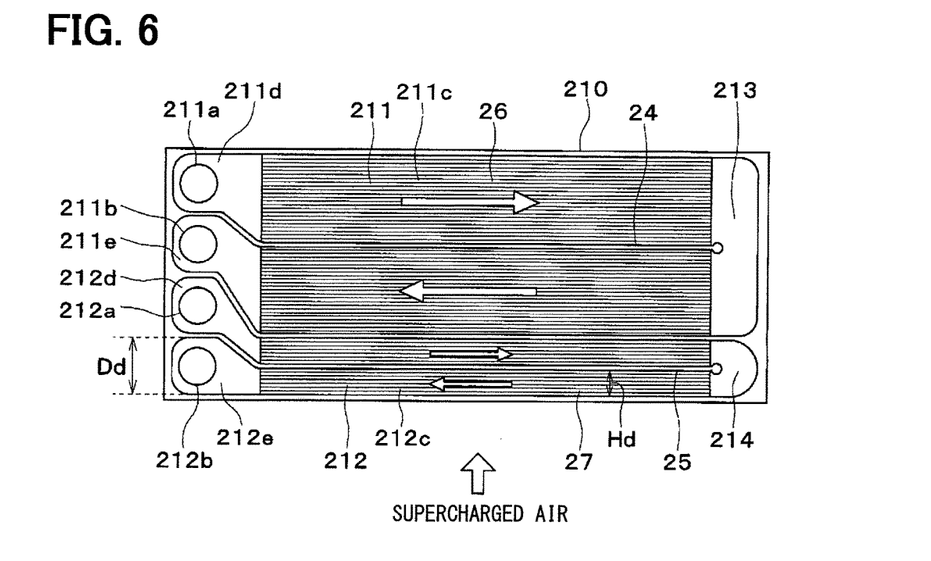
FIG. 6 is a diagram showing an inner portion of a channel tube according to a second embodiment.

As is shown in FIG. 6, a channel tube 21 of the present embodiment includes a first inner fin 26 dividing a first cooling water channel 211 into multiple fine channels and a second inner fin 27 dividing a second cooling water channel 212 into multiple fine channels. More specifically, the first inner fin 26 is provided to respective first mainstream portions 211c of the first cooling water channel 211. The second inner fin 27 is provided to respective mainstream portions 212c of the second cooling water channel 212.

Figure 7:
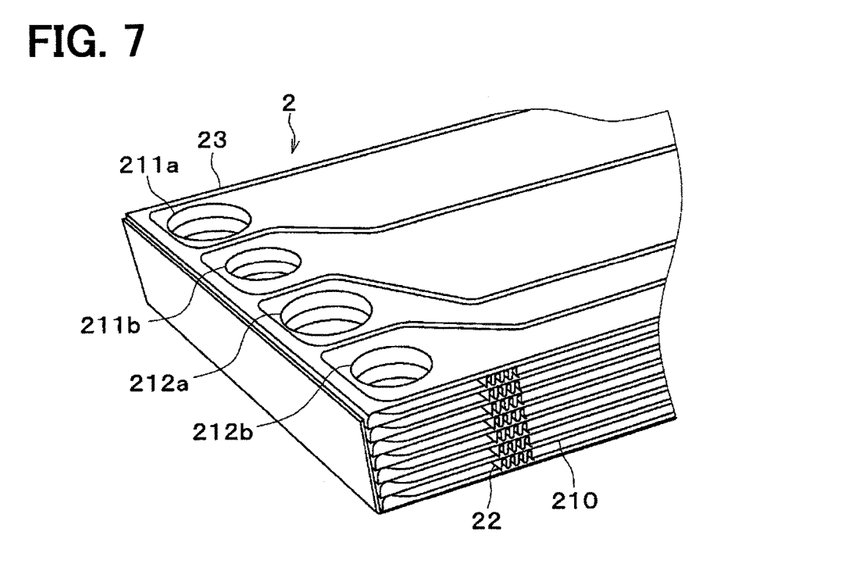
FIG. 7 is a perspective view showing an intercooler of the second embodiment.

As are shown in FIG. 6 and FIG. 7, a length Dd of a second outlet forming portion 212e in a flow direction of supercharged intake air is longer than a length Hd of the second cooling water channel 212 in the flow direction of the supercharged intake air, that is, a length Hd of each second mainstream portion 212c in the flow direction of the supercharged intake air. Also, a length of a second inlet forming portion 212d in the flow direction of the supercharged intake air is longer than the length Hd of the second mainstream portion 212c in the flow direction of the supercharged intake air.

A length of a first outlet forming portion 211e in the flow direction of the supercharged intake air is shorter than a length of the first cooling water channel 211 in the flow direction of the supercharged intake air, that is, a length of each first mainstream portion 211c in the flow direction of the supercharged intake air. Also, a length of a first inlet forming portion 211d in the flow direction of the supercharged intake air is shorter than the length of the first mainstream portion 211c in the flow direction of the supercharged intake air.

In the present embodiment, the first inlet forming portion 211d, the first outlet forming portion 211e, the second inlet forming portion 212d, and the second outlet forming portion 212e are all equal in length in the flow direction of the supercharged intake air.

As has been described above, in the present embodiment, the length Dd of each of the second inlet forming portion 212d and the second outlet forming portion 212e in the flow direction of the supercharged intake air is set longer than the length Hd of the second mainstream portion 212c in the flow direction of the supercharged intake air. Accordingly, even when the length Hd of the second mainstream portion 212c in the flow direction of the supercharged intake air is made shorter, it is not necessary to shorten the length Dd of the second inlet forming portion 212d and the second outlet forming portion 212e in the flow direction of the supercharged intake air. Hence, a space for forming a second inlet 212a and a second outlet 212b can be secured. In other words, even when the length Hd of the second mainstream portion 212c in the flow direction of the supercharged intake air is made shorter, it is no longer necessary to reduce a diameter of a hole of the second inlet 212a and the second outlet 212b according to the length Hd of the second mainstream portions 212c in the flow direction of the supercharged intake air. Hence, a water flow resistance of the second cooling water flowing through the second inlet 212a and the second outlet 212b can be restricted from increasing.

Figure 8:
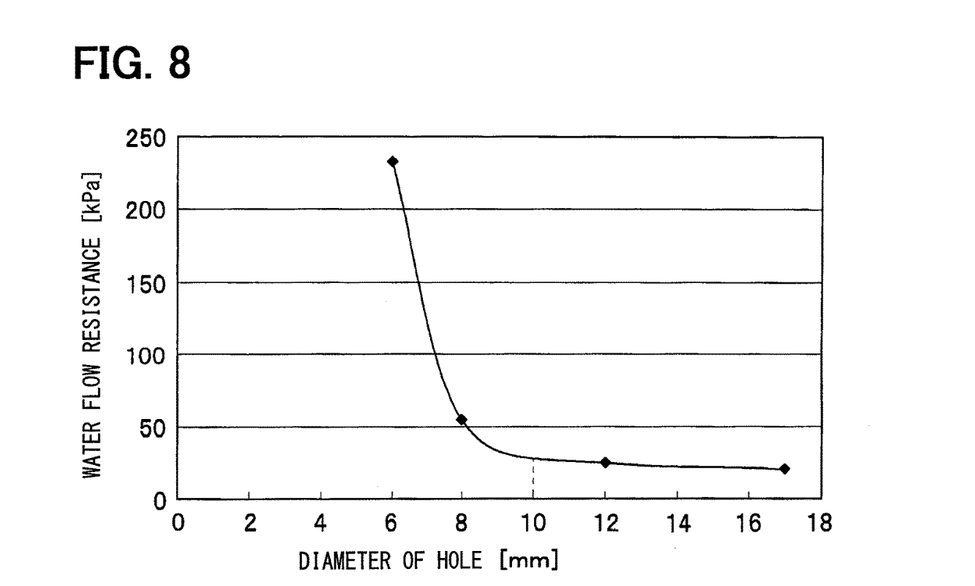
FIG. 8 is a characteristic view showing a relation between a diameter of a hole of a second outlet and a water flow resistance.

As is shown in FIG. 8, when the diameter of the hole of the second inlet 212a and the second outlet 212b is reduced to 10 mm or less, the water flow resistance of the second cooling water flowing through the second inlet 212a and the second outlet 212b increases sharply. Hence, when the diameter of the hole of the second inlet 212a and the second outlet 212b is 10 mm or less, it is particularly effective to make the length Dd of the second inlet forming portion 212d and the second outlet forming portion 212e in the flow direction of the supercharged intake air longer than the length Hd of the second main stream portion 212c in the flow direction of the supercharged intake air.

Third Embodiment

A third embodiment will be described with reference to FIG. 9. The third embodiment is different from the first embodiment above in a configuration of a channel tube 21.

Figure 9:
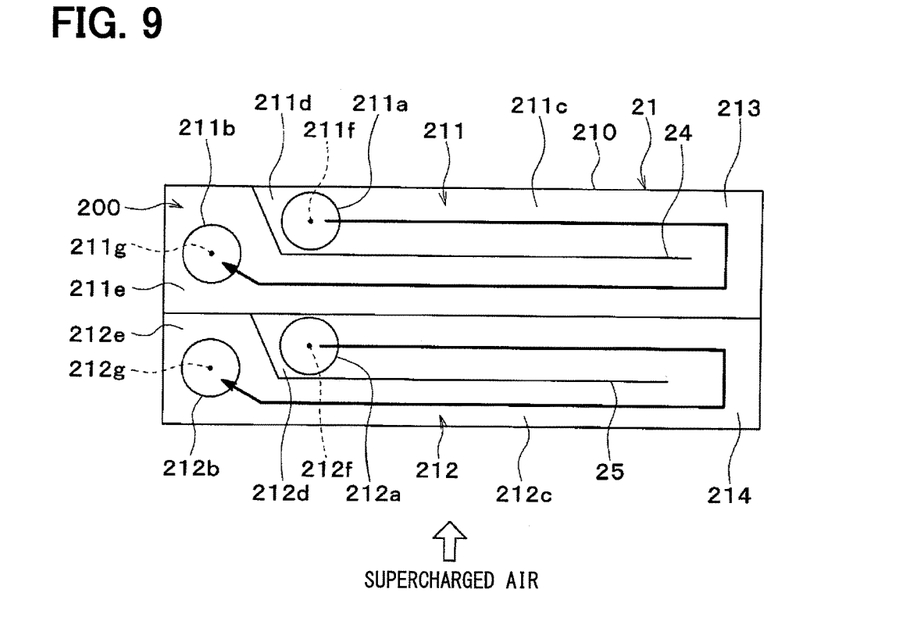
FIG. 9 is a diagram showing an inner portion of a channel tube according to a third embodiment.

As is shown in FIG. 9, a surface of a channel tube 21 where a first inlet 211a, a first outlet 211b, a second inlet 212a, and a second outlet 212b are provided is referred to as a layout surface 200. The layout surface 200 is orthogonal to a stacking direction of multiple channel tubes 21 (a direction perpendicular to a sheet surface of FIG. 9).

Each channel tube 21 is configured in such a manner that all of a center portion 211f of the first inlet 211a, a center portion 211g of the first outlet 211b, a center portion 212f of the second inlet 212a, and a center portion 212g of the second outlet 212b fail to position on a same linear line in the layout surface 200.

That is to say, not all of the center portions 211f, 211g, 212f, 212g of four through-holes forming the first inlet 211a, the first outlet 211b, the second inlet 212a, and the second outlet 212b, respectively, are positioned on a same linear line.

In other words, of the four through-holes provided to the layout surface 200, the center portion of at least one of two arbitrary through-holes is not positioned on a linear line linking the center portions of the remaining two through-holes.

In a case where the first inlet 211a, the first outlet 211b, the second inlet 212a, and the second outlet 212b are provided in such a manner that all of the corresponding center portions 211f, 211g, 212f, 212g are positioned on a same linear line, a length D of the channel tube 21 in a flow direction of supercharged intake air becomes longer as described in the following.

That is, as has been described in the second embodiment above, when a diameter of a hole of the second inlet 212a and the second outlet 212b is reduced to 10 mm or less, the water flow resistance of the second cooling water flowing through the second inlet 212a and the second outlet 212b increases sharply. In order to avoid such an inconvenience, when the diameter of the hole of the second inlet 212a and the second outlet 212b is set to 10 mm given as a minimum value at or above which the water flow resistance does not increase, a length $D_{HT}$ of a second cooling water channel forming portion in the flow direction of the supercharged intake air is increased to 35 mm or longer by taking a brazing margin into account.

When the first inlet 211a, the first outlet 211b, the second inlet 212a, and the second outlet 212b are provided in such a manner that all of the corresponding center portions 211f, 211g, 212f, 212g are positioned on a same linear line, the length D of the channel tube 21 in the flow direction of the supercharged intake air has to be 70 mm or longer in consideration of a desirable passage ratio $D_{HT}/D_{LT}$ as described in the first embodiment above. Hence, the length D of the channel tube 21 in the flow direction of the supercharged intake air cannot be made shorter.

On the contrary, in the present embodiment, the first inlet 211a, the first outlet 211b, the second inlet 212a, and the second outlet 212b are provided in such a manner that the corresponding center portions 211f, 211g, 212f, and 212g fail to position on a same linear line in the layout surface 200. Hence, the length D of the channel tube 21 in the flow direction of the supercharged intake air can be made shorter.

Other Embodiments

It should be appreciated that the present disclosure is not limited to the embodiments above and can be modified in various manners within the scope of the present disclosure as follows.

The embodiments above have described a case where the channel tube 21 has one first U-turn portion 213 and one second U-turn portion 214. However, the present disclosure is not limited to the configuration as above. The channel tube 21 may have two or more first U-turn portions 213 and two or more second U-turn portions 214.

The two plate-shaped members 210 forming the channel tube 21 are not necessarily provided in a pair. Alternatively, a cup-shaped plate member protruding toward a supercharged intake air passage and a flat plate-shaped member provided oppositely to the cup-shaped plate member may be bonded together.

The second embodiment above has described a case where the first inner fins 26 and the second inner fins 27 are provided in the channel tube 21. However, the first inner fins 26 and the second inner fins 27 may be omitted.

The invention claimed is:

1. An intercooler that cools a supercharged intake air supercharged by a supercharger into an engine by exchanging heat with a cooling medium, the intercooler comprising:
a heat exchange portion in which heat is exchanged between the cooling medium flowing inside a channel tube and the supercharged intake air flowing outside the channel tube, wherein:
the cooling medium includes a first cooling medium and a second cooling medium, a temperature of the second cooling medium being higher than that of the first cooling medium;
the channel tube includes a first cooling medium channel where the first cooling medium flows and a second cooling medium channel where the second cooling medium flows; and
the channel tube includes
a first U-turn portion forcing a flow of the first cooling medium flowing in the first cooling medium channel to make a U-turn, and
a second U-turn portion forcing a flow of the second cooling medium flowing in the second cooling medium channel to make a U-turn;
the channel tube is one of a plurality of channel tubes stacked with each other;
the channel tube has a through-hole forming portion where a through-hole is formed to allow a communication between the second cooling medium channels of the channel tubes adjacent to each other;
a length of the through-hole forming portion in the flow direction of the supercharged intake air is longer than a length of the second cooling medium channel in the flow direction of the supercharged intake air;
the channel tube further includes a second inlet forming portion forming a second inlet for the second cooling medium, and a second outlet forming portion forming a second outlet for the second cooling medium,
both of a length of the second inlet forming portion and a length of the second outlet forming portions in the flow direction of the supercharged intake air are larger than the length of the second cooling medium channel in the flow direction of the supercharged intake air, and
both of the length of the second inlet forming portion and the length of the second outlet forming portion in the flow direction of the supercharged intake air are smaller than a length of the first cooling medium channel in the flow direction of the supercharged intake air.

2. The intercooler according to claim 1, wherein:
the channel tube is formed by two opposing plate-shaped members.

3. The intercooler according to claim 1, wherein:
a length of the second cooling medium channel of the channel tube in the flow direction of the supercharged intake air is longer than or equal to 20 mm.

4. The intercooler according to claim 1, wherein:
a length of the channel tube in the flow direction of the supercharged intake air is shorter than or equal to 200 mm.

5. The intercooler according to claim 1, wherein:
the channel tube has
a first inlet through which the first cooling medium flows into the first cooling medium channel, and
a first outlet through which the first cooling medium flows out from the first cooling medium channel,
the first inlet, the first outlet, the second inlet, and the second outlet are arranged on a layout surface of the channel tube; and
the channel tube is configured in such a manner that respective center portions of the first inlet, the first outlet, the second inlet, and the second outlet fail to position on a same one linear line in the layout surface, such that the center portion of the first inlet is offset toward the first U-turn portion relative to the center portion of the first outlet in a flow direction of the first cooling medium, and that the center portion of the second inlet is offset toward the second U-turn portion relative to the center portion of the second outlet in a flow direction of the second cooling medium.

6. The intercooler according to claim 1, wherein:
the channel tube further includes a first inlet forming portion forming a first inlet for the first cooling medium, and a first outlet forming portion forming a first outlet for the first cooling medium, and
both of a length of the first inlet forming portion and a length of the first outlet forming portion in the flow direction of the supercharged intake air are smaller than the length of the first cooling medium channel in the flow direction of the supercharged intake air.

7. The intercooler according to claim 6, wherein:
the first inlet forming portion, the first outlet forming portion, the second inlet forming portion, and the second outlet forming portion are all equal in length in the flow direction of the supercharged intake air.

\* \* \* \* \*